United States Patent [19]

Bell

[11] 4,285,056
[45] Aug. 18, 1981

[54] REPLICABLE OPTICAL RECORDING MEDIUM

[75] Inventor: Alan E. Bell, East Windsor, N.J.

[73] Assignee: RCA Corporation, New York, N.Y.

[21] Appl. No.: 85,547

[22] Filed: Oct. 17, 1979

[51] Int. Cl.³ .............................................. G11B 7/00
[52] U.S. Cl. .................................. 369/100; 369/284; 369/286; 369/288; 358/297; 346/135.1; 346/76 L
[58] Field of Search ................. 179/100.1 G, 100.1 B, 179/100.3 V; 358/128.5, 127, 297; 274/41 R, 41 A, 41.6 R, 42 R; 365/120, 127; 346/135.1, 76 L, 76 R

[56] References Cited

U.S. PATENT DOCUMENTS

| | | | |
|---|---|---|---|
| 3,636,526 | 1/1972 | Feinleib | 179/100.3 V |
| 3,665,483 | 5/1972 | Becker | 346/76 L |
| 3,842,194 | 10/1974 | Clemens | 179/100.1 B |
| 3,889,272 | 6/1975 | Lou | 346/76 L |
| 3,902,010 | 8/1975 | Goshima | 179/100.3 V |
| 4,069,487 | 1/1978 | Kasai | 346/76 L |
| 4,097,895 | 6/1978 | Spong | 179/100.3 V |
| 4,101,907 | 7/1978 | Bell et al. | 179/100.1 G |
| 4,188,214 | 2/1980 | Kido | 346/76 L |
| 4,195,312 | 3/1980 | Bell et al. | 346/76 L |

OTHER PUBLICATIONS

Palemo et al., *Optica Y Laser Tech.*, Aug. 1977, p. 169.

*Primary Examiner*—Bernard Konick
*Assistant Examiner*—Alan Faber
*Attorney, Agent, or Firm*—Birgit E. Morris; William J. Burke

[57] ABSTRACT

An optical recording medium which comprises a light reflective layer, a light transmissive layer and a light absorptive layer, the material comprising the light transmissive layer has a melting, sublimation or decomposition temperature at least 300° C. less than that of the material comprising the absorptive layer. Information is recorded as openings in both the light transmissive and absorptive layers or as bubbles in the absorptive layer. These storage mechanisms produce topographical features which are suitable for replication, thus allowing direct replication of the recorded information.

21 Claims, 6 Drawing Figures

REPLICABLE OPTICAL RECORDING MEDIUM

This invention relates to an optical recording medium which has improved recording performance and which can be replicated without further processing steps.

BACKGROUND OF THE INVENTION

Spong, in U.S. Pat. No. 4,097,895, which issued June 27, 1978, has disclosed an ablative optical recording medium for use in an optical recording system, which medium comprises a light reflective material which is coated with a layer of a light absorptive organic material. A focused, modulated light beam, such as a light beam from an argon ion laser, when directed at the recording medium, vaporizes or ablates the light absorptive layer, leaving an opening in this layer and exposing the light reflecting material. The thickness of the light absorptive layer is chosen so that the reflectivity of the recording medium is reduced.

Bell, in a co-pending application, Ser. No. 054,437 filed July 3, 1979, which is a continuation of Ser. No. 782,032 filed Mar. 28, 1977, now abandoned, has disclosed an improved ablative trilayer optical recording medium for use in the Spong optical recording system. The trilayer optical recording medium comprises a light reflective material, a layer of a light transmissive material overlying the light reflective material, and a layer of light absorptive material overlying the light transmissive layer. The thickness of the light absorptive layer is so related to the thickness of the light transmissive layer and the optical constants of the light reflective material and the transmissive and absorptive layers, so as to reduce the optical reflectivity of the recording medium. A maximum fraction of light impinging on the recording medium from a focused, modulated light beam, is then absorbed and converted to thermal energy in the light absorbing layer. The thermal energy ablates or melts the light absorptive layer producing an opening in the layer and thus exposing the underlying light reflecting layer through the light transmissive layer.

The reflectivity in the area of the opening of the light absorptive layer is essentially that of the light reflective layer and is much greater than that of the surrounding unexposed region. During readout this difference in reflectivities is detected optically and converted into an electrical signal representative of the recorded information.

The trilayer recording medium of Bell can be formed of aluminum as the light reflective material, a silicon dioxide light transmissive layer and a titanium metal light absorptive layer typically about 2 to 12 nanometers thick. This recording medium has good archival properties and signal-to-noise performance upon readout of information recorded at powers well above the threshold power for recording but has a comparatively low recording sensitivity. Replacement of the titanium layer with a tellurium layer increases the recording sensitivity but degrades the archival performance of the recording medium. Thus for archival purposes, a layer comprised of a material such as titanium is preferred.

It would also be desirable to reproduce the recorded medium so that multiple copies could be obtained. However, because the absorptive layer is so thin, openings in this layer are difficult to replicate to form a master from which copies can be made.

Thus, it would be desirable to be able to record information using the recording medium of Bell because of its desirable recording and readout features, while at the same time being able to replicate the recorded information.

SUMMARY OF THE INVENTION

An optical recording medium which comprises a light reflective layer, a light transmissive layer, overlying the reflective layer, and a light absorptive layer overlying the transmissive layer wherein the light transmissive layer melts, decomposes or sublimes at a temperature at least 300° C. less than the melting temperature of the light absorptive layer. Information is recorded as one or more openings in both the light transmissive and light absorptive layers, or as a bubble in the light absorptive layer.

The invention also includes a method for the direct replication of information recorded in the form of topographical features in the recording medium.

DETAILED DESCRIPTION OF THE INVENTION

Figure 1:
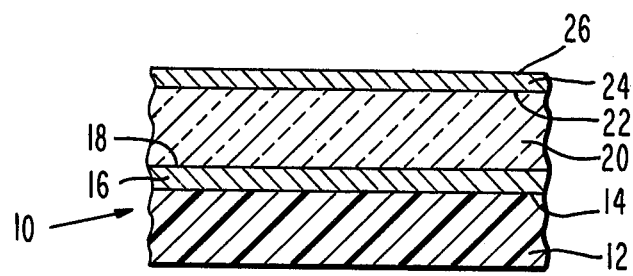
FIG. 1 is a schematic illustration of a cross-sectional view of an optical recording medium.

FIG. 1 is a schematic illustration of a cross-sectional view of a recording medium 10 of the invention. The optical recording medium 10 comprises a substrate 12 having a surface 14; a light reflecting layer 16 having a surface 18 overlying the surface 14 of the substrate 12; a light transmissive layer 20 having a surface 22 overlying the surface 18 of the light reflective layer 16; and a light absorptive layer 24 having a surface 26 overlying the surface 22 of the light transmissive layer 20.

Figure 2:
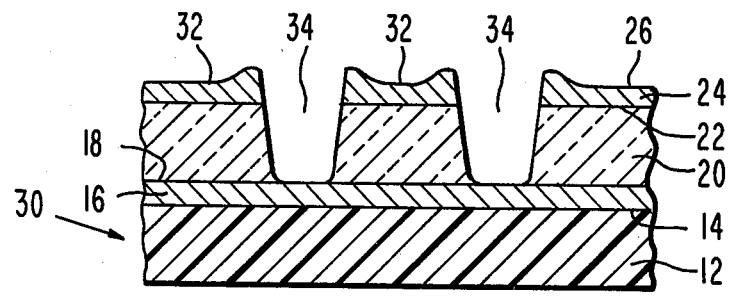
FIG. 2 is a schematic illustration of a cross-sectional view of a recording medium with information recorded therein in the form of openings in the light transmissive and light absorptive layers.

FIG. 2 is a schematic illustration of a cross-sectional view of a recording medium 30 of the invention in which information has been recorded in the form of openings in both the light absorptive and the light transmissive layers. The identification of the layers of the recording medium correspond to those of FIG. 1. The information has been recorded in the form of a series of openings 34 in both the light absorptive layer 24 and the light transmissive layer 20. Typically information is recorded by varying the length of the openings 34 and the unexposed areas 32 between the openings 34 along the direction of a track. The length of the openings 34 are determined by the length of time the recording medium is exposed to the recording light beam and the speed at which the medium is moving through the focal plane of the recording light beam.

Figure 3:
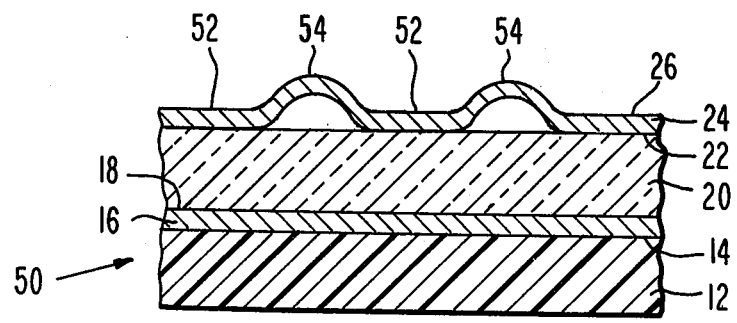
FIG. 3 is a schematic illustration of a cross-sectional view of an optical recording medium with information recorded therein in the form of bubbles in the light absorptive layer.

FIG. 3 is a schematic illustration of a recording medium 50 of the invention. The identification of the layers of the recording medium correspond to those of FIGS. 1 and 2. After recording, the surface 26 of the recording medium 50 consists of unexposed areas 52 and exposed areas 54 in which bubbles are formed.

The substrate 12 may be formed of glass or plastic material, such as polyvinyl chloride, typically in the form of a disk. Alternatively, the substrate 12 may also be formed of a material such as aluminum which reflects light at the recording wavelength, thus combining the functions of the substrate 12 and the light reflective layer 16. A substrate, if present, need only be thick enough to support the remainder of the structure. Since any roughness of the surface 14 of the substrate 12 on the scale of the focused light beam diameter will produce noise in the signal channel during readout, a nonconformal coating of a plastic material, such as an epoxy resin, on the surface 14 prior to deposition of the light reflective layer 16 thereon, will produce a microscopically smooth surface and eliminate this noise source.

The light reflective layer 16 reflects a substantial fraction of the incident light at the recording wavelength and is typically formed of a metal such as aluminum or gold which exhibits high reflectivity. Preferably the light reflective layer reflects at least 50% of the light incident on this layer. The reflective layer 16, which is typically about 30 to 60 nanometers thick, may be deposited on the surface 14 of the substrate 12 using vacuum evaporation techniques.

The light transmissive layer 20 is formed of a material which is substantially transparent at the recording wavelength and which has a melting temperature which is more than 300° C. less than the melting temperature of the material which constitutes the light absorptive layer 24. For materials which satisfy these criteria, heat conduction from the light absorptive layer into the light transmissive layer will cause the light transmissive material to reach its melting, sublimation or decomposition point before the light absorptive layer reaches its melting temperature. If the light transmissive material melts, the structure becomes unstable and surface tension may cause the material in both the transmissive and absorptive layers to draw up around the edge of the hole created. This is believed to be the explanation of the recording mechanism illustrated in FIG. 2. If the light transmissive material decomposes or sublimes, or if its vapor pressure increases rapidly as the melting temperature is approached, the pressure of the trapped gases can cause a bubble to form in the absorptive layer. This is believed to be the explanation of the recording mechanism illustrated in FIG. 3.

For a given material the thickness of the transmissive layer will determine the temperature profile in this layer. For a thin transmissive layer the temperature differential between the opposed surfaces of the layer would be smaller, thus allowing a portion of the thickness to melt. For a thick transmissive layer the temperature at the surface of the layer adjacent to the light absorptive layer could reach or exceed the melting, decomposition or sublimation temperature of the material comprising the transmissive layer, while the temperature at the opposite surface of the transmissive layer remains well below this critical temperature. In this case the light absorptive layer could be deformed without complete melting of the transmissive layer occurring.

The thickness of the light transmissive layer is thus a compromise between the thickness required to produce a reduced reflectivity for the recording medium and the thickness required by thermal considerations to permit the melting or vaporization of the light transmissive layer. Thicknesses of the light transmissive layer between about 10 nanometers and about 500 nanometers are useful. Thicknesses between about 30 nanometers and about 100 nanometers are preferred.

Materials found to be useful for the transmissive layer include magnesium fluoride, which melts at a temperature of 1261° C., or lead fluoride, which melts at 855° C., as compared to a melting temperature of 1668° C. for titanium. On the other hand, the prior art silicon dioxide melts at a temperature between 1650° and 1700° C., which is comparable to the melting temperature of titanium, the light absorptive layer. Magnesium fluoride and lead fluoride can be deposited on the surface 18 of the light reflective layer 16 using standard evaporation techniques.

The light absorptive layer 24 is formed of a material which absorbs light at the recording wavelength. Suitable materials include titanium, platinum, rhodium, gold, nickel, chromium, manganese, and vanadium, which may be deposited using standard evaporation or electron beam evaporation techniques. Thicknesses of the absorptive layer between about 2 nanometers and about 25 nanometers are suitable. Thicknesses between about 2 nanometers and about 12 nanometers are preferred. After exposure to the atmosphere, some of these materials will partially oxidize leaving an absorbing layer which is thinner than the layer originally deposited. This effect may be compensated for by depositing a layer which is thicker than that desired, with the subsequent oxidation reducing the effective thickness of this layer to the desired value. The thicknesses of the absorptive layer discussed or claimed below are the desired values.

The recording processes illustrated in FIGS. 2 and 3 differ markedly from that of the prior art recording medium which is comprised of an aluminum light reflective layer, a silicon dioxide light transmissive layer, and a titanium or tellurium light absorptive layer. In that medium, the information is recorded by the formation of openings in the absorptive layer alone. The recording sensitivity of those media increased as the thicknesses of the light transmissive and light reflective layers were adjusted so as to minimize the reflectivity of the medium.

To eliminate or reduce signal defects caused by surface dust which precipitates from the environment, an overcoat layer of about 0.05 to about 1 millimeter thick can be applied to the light absorptive layer. Dust particles which settle on the upper surface of the overcoat layer are far removed from the focal plane of the optical system, so that their effect on the recording or read out of information is considerably reduced. A useful material for this application is a silicone resin. An overcoat layer would not be used if replication of the recorded information is desired.

Recording media of the invention in the form of disks were tested by recording video information with a signal bandwidth of 0 to about 4.2 megahertz encoded on a frequency modulated carrier with a deviation from about 7 megahertz to about 10 megahertz. The quality of the recordings made using a modulated argon ion laser were evaluated by measuring the signal-to-noise ratio of the readout video information as a function of the incident power on the disk.

The signal-to-noise ratio on readout is defined as the ratio of the peak-to-peak video signal to root mean square noise in the full video bandwidth as measured by a model 1430 random noise measuring set manufactured by the Tektronix Corp., Beaverton, Oreg.

EXAMPLE NO. 1

Figure 4:
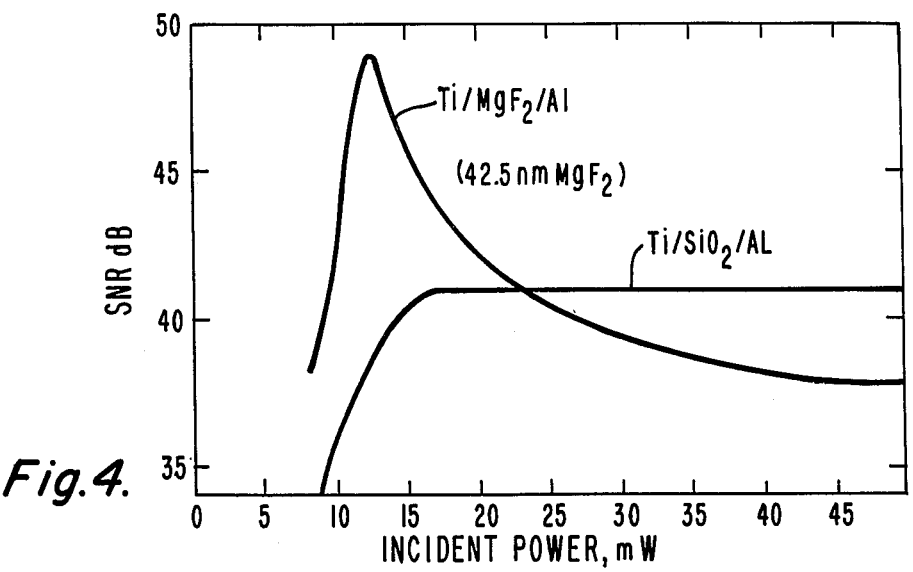
FIG. 4 is a graph of the playback signal-to-noise performance of the optical recording medium of the invention and a prior art optical recording medium as a function of light power incident on the recording medium.

FIG. 4 illustrates the recording behavior for a recording medium comprised of an aluminum light reflective layer, a magnesium fluoride light transmissive layer about 42.5 nanometers thick and a titanium light absorptive layer about 7 nanometers thick. These thicknesses were such that the minimum reflectivity of 3% at the 488 nanometer wavelength of the recording light beam was obtained. Also shown in the Figure is the recording behavior of a prior art disk having an SiO$_2$ light transmissive layer with a reflectivity of 3% at 488 nanometers which was measured under the same conditions. The threshold for recording occurs at approximately the same incident power level. The disk having the MgF$_2$ transmissive layer exhibits a much higher signal-to-noise ratio over a range of incident powers just above the threshold.

Over the whole range of recording powers an opening was formed in both the light transmissive and light absorptive layers.

EXAMPLE NO. 2

Figure 5:
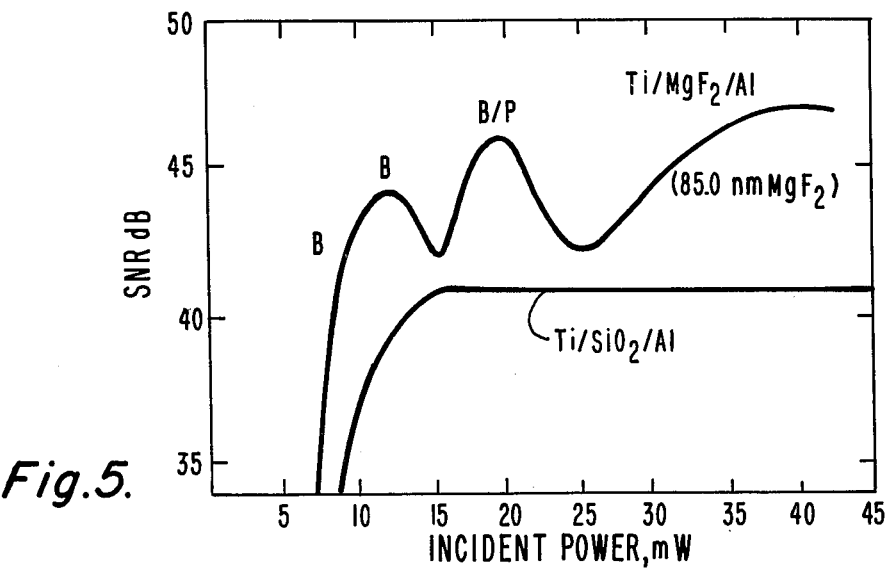
FIG. 5 is a graph of the playback signal-to-noise performance of the optical recording medium of the invention and an optical recording medium of the prior art as a function of light power incident on the recording medium.

FIG. 5 illustrates the recording behavior for a recording medium comprised of an aluminum light reflective layer and magnesium fluoride light transmissive layer about 85 nanometers thick and a titanium light absorptive layer about 7 nanometers thick. These thicknesses were such that the reflectivity at 488 nanometers of the recording medium was reduced only to about 16%. Also shown in the Figure is the recording behavior of a prior art disk having a silicon dioxide transmissive layer with a reflectivity of 3% at 488 nanometers. As in the previous example, the threshold for recording occurs at about the same incident power level. The disk having the magnesium fluoride transmissive layer exhibited a higher signal-to-noise ratio over the whole range of incident powers measured, particularly just above the threshold.

Over the range of incident power marked as B on the upper curve of FIG. 5, only bubbles were formed in the absorptive layer. The point labelled B/P on the curve marks the transition region where bubbles with openings are formed. Beyond this point the information was recorded as openings in layers 20 and 24 of FIG. 2.

Figure 6:
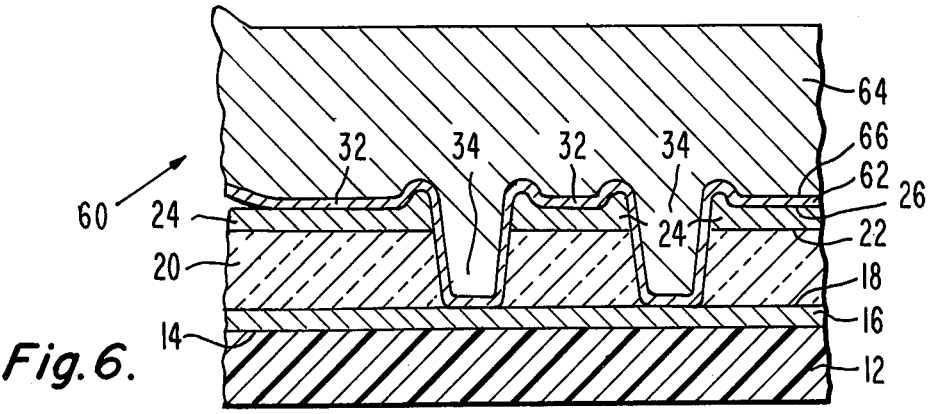
FIG. 6 is a schematic illustration of a cross-sectional view of an optical recording medium of the invention with information recorded therein and the layers of the replication master thereon.

Using a recording medium as described above wherein information is recorded in the form of topographical features of a magnitude suitable for replication, replicas of the information so recorded can be made using techniques standard in the art. FIG. 6 is a schematic illustration of a recording medium 60 with the layers required for replication thereon. Identification of the layers of the recording medium and the recorded information features correspond to those used in FIGS. 1 and 2.

After the information is recorded a coating layer 62 is formed on the surface 26 of the recording medium. The coating layer 62 may be formed by evaporation of metals such as gold or copper or by electroless plating of a metal such as nickel. The coating layer 62 thus formed should be an electrically conducting, pinhole free, conformal layer. Typically, this layer can be from about 30 nanometers to about 120 nanometers thick.

A master layer 64 is then formed on the surface 66 of the coating layer 62 using a technique such as electrodeposition. A layer of nickel or copper, preferably from about 200 micrometers to about 300 micrometers thick which is both self-supporting and stress-free, is suitable.

The master layer 64 together with the coating layer 62 is then separated from the recording medium, thus producing a metal replica of the recorded information in topographical form suitable for further use in making copies of the recorded information.

EXAMPLE NO. 3

Replicas were made from recording media in which information was recorded as openings or in the form of bubbles as in Examples 1 and 2. The samples were then coated with a layer of gold about 80 nanometers thick by evaporation and then with a layer of nickel about 250 micrometers thick by electro-deposition. The replicas were then separated from the recording medium and were examined using the scanning electron microscope. This evaluation showed that a faithful replica was formed in each case.

I claim:

1. A recording medium for use in an optical recording-readout system employing light of a certain wavelength comprising:
   a light reflective layer which reflects light at said wavelength;
   a light transmissive layer, overlying said reflective layer, of a material which is substantially transparent at said wavelength, and has a thickness greater than about 10 nanometers; and
   a light absorptive layer overlying said transmissive layer of a material which is absorptive of light at said wavelength;
   wherein said transmissive layer is comprised of a material which melts, decomposes or sublimes at a temperature at least 300° C. less than the melting temperature of the material which comprises said absorptive layer.

2. A recording medium according to claim 1 wherein the thickness of said light transmissive layer is between about 10 nanometers and about 500 nanometers.

3. A recording medium according to claim 1 wherein the thickness of said light transmissive layer is between about 30 nanometers and about 100 nanometers.

4. A recording medium according to claim 1 wherein said light transmissive layer is comprised from materials selected from the group consisting of magnesium fluoride and lead fluoride.

5. A recording medium according to claim 1 wherein the thickness of said light absorptive layer varies from about 2 nanometers to about 25 nanometers.

6. A recording medium according to claim 1 wherein said light absorptive layer is comprised of material selected from the group consisting of titanium, platinum, rhodium, gold, nickel, chromium, manganese and vanadium.

7. A recording medium according to claim 1 wherein said light transmissive layer is comprised of magnesium fluoride and said light absorptive layer is comprised of titanium.

8. An information record having an information track recorded therein for use in an optical recording and readout system employing light of a certain wavelength which comprises:
- a light reflective layer which reflects light at said wavelength;
- a light transmissive layer, overlying said light reflective layer, of a material which is substantially transparent to light at said wavelength and has a thickness greater than about 10 nanometers;
- and a light absorptive layer, overlying said transmissive layer, of a material which is absorptive of light at said wavelength;
- wherein said transmissive layer is comprised of a material which melts, decomposes or sublimes at a temperature at least 300° C. less than melting temperature of the material which comprises said absorptive layer;
- and wherein said information track comprises a sequence of openings in said transmissive and absorptive layers or bubbles in said absorptive layer with variations in either or both the length of the openings or bubbles along the track and the spacing between successive openings or bubbles being representative of the recorded information.

9. A recording medium according to claim 8 wherein the thickness of said light transmissive layer is between about 10 nanometers and about 500 nanometers thick.

10. An information record according to claim 8 wherein the thickness of said light transmissive layer is between about 30 nanometers and 100 nanometers.

11. An information record according to claim 8 wherein said light transmissive layer is comprised of a material selected from the group consisting of magnesium fluoride and lead fluoride.

12. An information record according to claim 8 wherein the thickness of said light absorptive layer is between about 2 nanometers and about 25 nanometers.

13. An information record according to claim 8 wherein said light absorptive layer is comprised of a material selected from a group consisting of titanium, platinum, rhodium, gold, nickel, chromium, manganese and vanadium.

14. An information record according to claim 8 wherein said light transmissive layer is comprised of magnesium fluoride and said light absorptive layer is comprised of titanium.

15. A method of replicating information recorded on an optical recording medium in a recording system employing a modulated light beam of a certain wavelength which comprises the steps of:
- forming a recording medium which comprises a light reflective layer reflective of light at said wavelength, a light transmissive layer, overlying said reflective layer, of a material substantially transparent to light at said wavelength, having a thickness of at least 10 nanometers and which melts, decomposes or sublimes at a temperature which is at least 300° C. less than that of the material comprising the light absorptive layer, and a light absorptive layer, overlying said transmissive layer, of a material which is absorptive of light at said wavelength;
- exposing said recording medium to said modulated light beam to form an information track therein, wherein said information track comprises a sequence of openings in said transmissive and absorptive layers or a sequence of bubbles in said absorptive layer with variations in either or both the length and spacing between successive openings or bubbles being representative of said information;
- coating the exposed surface having said openings or bubbles therein with a conducting, conformal contact layer;
- coating said contact layer with a master layer having a thickness such that said master layer coated with said contact layer is self-supporting when separated from said recording medium;
- separating said master layer having said contact layer thereon, from said recording medium.

16. A method according to claim 15 wherein said light transmissive layer is comprised of a material selected from the group consisting of magnesium fluoride and lead fluoride.

17. A method according to claim 15 wherein the thickness of said light transmissive layer is between about 10 nanometers and 500 nanometers.

18. A method according to claim 15 wherein said light absorptive layer is comprised of a material selected from the group consisting of titanium, platinum, rhodium, gold, nickel, chromium, manganese and vanadium.

19. A method according to claim 15 wherein the thickness of said light absorptive layer is between about 2 nanometers and 25 nanometers.

20. A method according to claim 15 wherein said coating layer is comprised of a material selected from the group consisting of gold, copper and nickel.

21. A method according to claim 15 wherein said master layer is comprised of a material selected from the group consisting of copper and nickel.

* * * * *